United States Patent
Ernst (10) Patent No.: US 11,151,691 B2
(45) Date of Patent: Oct. 19, 2021

(54) IMAGE SCALING WITH ENHANCED COMPRESSION

(71) Applicant: Larry M Ernst, Longmont, CO (US)

(72) Inventor: Larry M Ernst, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 118 days.

(21) Appl. No.: 16/577,355

(22) Filed: Sep. 20, 2019

(65) Prior Publication Data
US 2021/0090218 A1   Mar. 25, 2021

(51) Int. Cl.
*G06T 3/40*   (2006.01)
*G06K 9/62*   (2006.01)

(52) U.S. Cl.
CPC .......... *G06T 3/4061* (2013.01); *G06K 9/6218* (2013.01)

(58) Field of Classification Search
CPC .... H04N 19/119; H04N 19/182; H04N 19/93; H04N 1/40068; H04N 1/40075; H04N 1/40087; H04N 1/405
See application file for complete search history.

(56) References Cited

U.S. PATENT DOCUMENTS

| | | | |
|---|---|---|---|
| 4,500,919 A * | 2/1985 | Schreiber | H04N 1/6005 358/518 |
| 5,745,659 A | 4/1998 | Rigau et al. | |
| 5,983,251 A * | 11/1999 | Martens | H04N 19/186 375/E7.083 |
| 6,614,553 B2 | 9/2003 | Nakami et al. | |
| 7,349,124 B2 | 3/2008 | Zuber | |
| 8,004,705 B2 | 8/2011 | Nakayama | |
| 8,118,380 B2 | 2/2012 | Lapstun et al. | |
| 8,538,199 B2 | 9/2013 | Ernst et al. | |
| 9,245,214 B2 * | 1/2016 | Varga | H04N 19/119 |
| 2005/0105138 A1 * | 5/2005 | Lapstun | B41J 2/155 358/3.13 |
| 2015/0163375 A1 * | 6/2015 | Chandu | H04N 1/405 358/3.2 |

(Continued)

FOREIGN PATENT DOCUMENTS

| | | |
|---|---|---|
| JP | 2006163861 A | 6/2006 |
| JP | 4622762 B2 | 2/2011 |

OTHER PUBLICATIONS

CsXImage Version 5.0—Online Manual; Chestysoft 2018.

(Continued)

*Primary Examiner* — Ross Varndell
(74) *Attorney, Agent, or Firm* — Duft & Bornsen, PC (57) ABSTRACT

Systems and methods are provided for image scaling with enhanced compression. One embodiment is a processor that receives an instruction to scale an input image to create an output image that is higher in resolution, and analyzes rows of the input image in sections according to a run length of a predetermined number of consecutive pels. For each run length of consecutive pels, the processor determines a cluster of adjacent pels within the run length having a color intensity value within a threshold range, and determines a replacement intensity value for the cluster based on at least one color intensity value of a pel in the cluster. The processor creates the output image by: upscaling the cluster by the scale factor to multiply a number of pels in the cluster, and changing an intensity value of all pels in the cluster to the replacement intensity value.

16 Claims, 6 Drawing Sheets

(56) References Cited

U.S. PATENT DOCUMENTS

2019/0138256 A1    5/2019   Kahwaji et al.
2019/0171876 A1*   6/2019   Segalovitz ......... G06K 9/00442

OTHER PUBLICATIONS

Garrett M Johnson et al; A Top Down Description of S-CIELAB and CIEDE2000; Rochester Institute of Technology; Rochester, NY 14623; Nov. 27, 2001.
Garrett M Johnson et al; Darwinism of Color Image Difference Models; Rochester Institute of Technology, Rochester, NY; Nov. 2001.
Jon Hardeberg; Acquisition and reproduction of colour images; colorimetric and multispectral approaches; Paris France 1999.
Kiran Gutha; MNIST for Machine Learning Beginners With Softmax Regression; Jun. 20, 2018.
Resampling; A few scanning tips; www.scantips.com; Wayne Fulton; 1997-2010.
X. Zhang et al; A spatial extension of CIELAB for digital color-image reproduction; 1997.
Xuemei Zhang; S-CIELAB: A Spatial Extension to the CIE L a b DeltaE Color Difference Metric; May 18, 1998.

* cited by examiner

IMAGE SCALING WITH ENHANCED COMPRESSION

FIELD

This disclosure relates to scaling digital images.

BACKGROUND

Image scaling refers to expanding (i.e. upscaling) or reducing (i.e. downscaling) the resolution of an input image to create an output image with a desired different resolution. In the field of printing, for example, it may be necessary to upscale an image embedded within a print job (e.g., 300 dots per inch (dpi)) to a bitmap that matches the print engine resolution (e.g., 600 dots per inch). However, for high-speed production printers, print jobs having complex images that are not easily processed or compressed can cause a back-hitch in which blank pages are printed if images are not processed fast enough to maintain the print speed of the targeted printer. Accordingly, image scaling techniques are desired which reduce image processing requirements and improve image compression.

SUMMARY

Embodiments described herein provide for image scaling with enhanced compression. In particular, a technique of upscaling an image is disclosed which increases the number of adjacent pels having the same intensity value. That is, neighboring pels having relatively close intensity levels are replaced to have a common value during image upscaling. The technique modifies the image with minimal image print quality degradation and also enhances compression of the image. By minimizing image computation and enhancing image compressing during an image upscaling process, print job processing is improved and occurrence of a back-hitch condition during printing is reduced.

One embodiment is an image scaling system that includes a processor that receives an instruction to scale an input image having a first resolution by a scale factor to create an output image having a second resolution that is higher than the first resolution, analyzes the input image by rows of pels, and analyzes each row in sections according to a run length of a predetermined number of consecutive pels. For each run length of consecutive pels, the processor determines a cluster of adjacent pels within the run length having a color intensity value within a threshold range, and determines a replacement intensity value for the cluster based on at least one color intensity value of a pel in the cluster. The processor creates the output image by: upscaling the cluster by the scale factor to multiply a number of pels in the cluster, and changing an intensity value of all pels in the cluster to the replacement intensity value, wherein an area of the output image corresponding with at least one pel in the input image is modified by the changing of the intensity value of all pels in the cluster.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
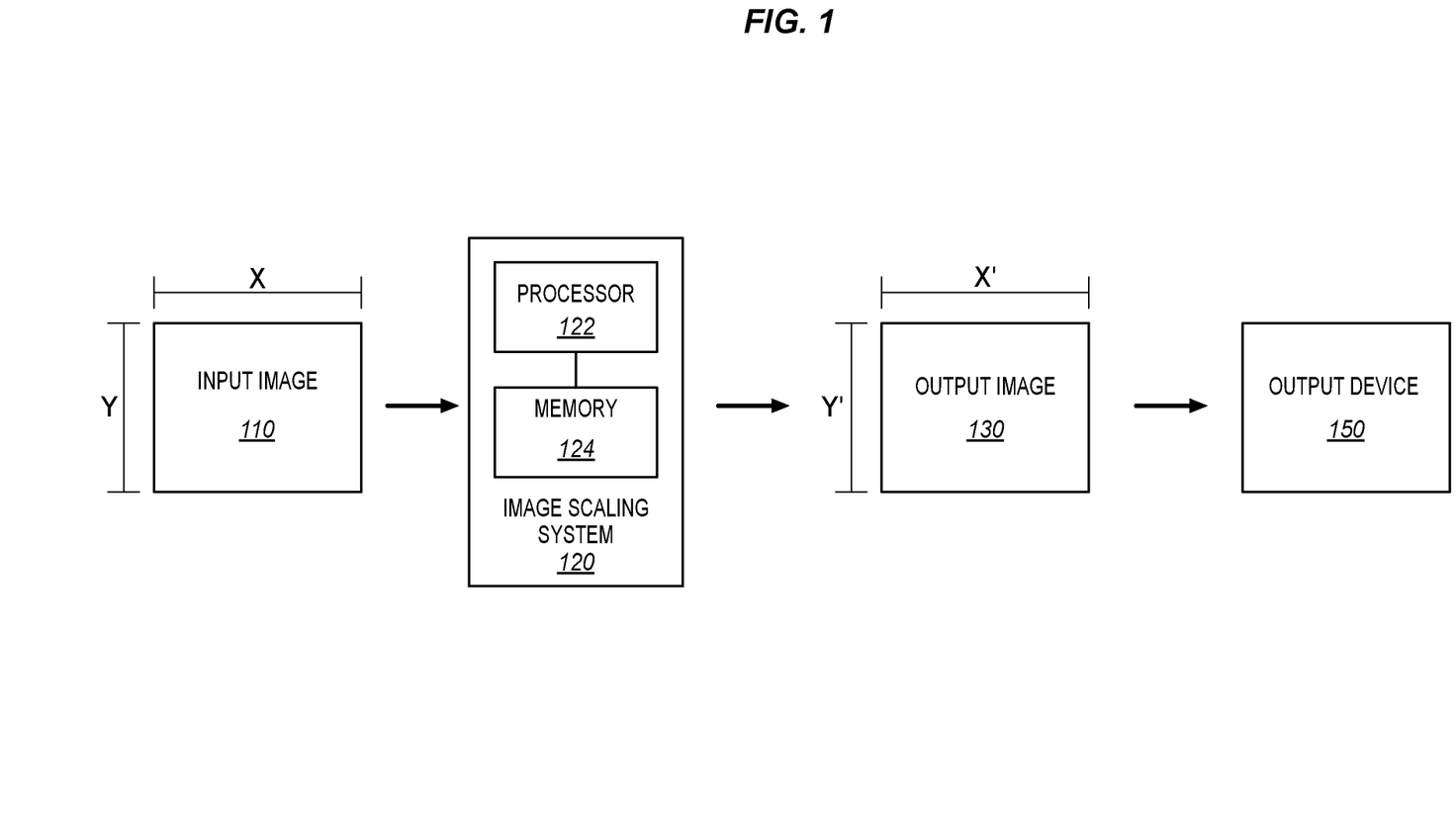
FIG. 1 illustrates an image scaling system in an illustrative embodiment.

FIG. 1 illustrates an image scaling system 120 in an illustrative embodiment. The image scaling system 120 may be any system, device, circuitry and/or other suitable component that is operable to scale an input image 110 of [X, Y] resolution into an output image 130 of [X', Y'] resolution. The image scaling system 120 may scale the input image 110 up or down and by any number of scaling factors including non-integer scaling factors. As described in greater detail below, the image scaling system 120 is enhanced to efficiently upscale the input image 110 to create the output image 130 with improved compression features. After converting the input image 110 into the output image 130, the image scaling system 120 transmits the scaled output image 130 to an output device 150 for presentation of the output image 130. Examples of the output device 150 that receive the scaled output image for presentation include printers, display screens, digital cameras, etc.

In one embodiment, the image scaling system 120 is implemented by a processor 122 communicatively coupled to a memory 124. The processor 122 includes any electronic circuits and/or optical circuits that are able to perform functions. For example, the processor 122 may include one or more Central Processing Units (CPU), Graphics Processing Units (GPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc. The memory 124 includes any electronic circuits, optical circuits, and/or magnetic circuits that are able to store data. For instance, the memory 124 may include one or more volatile or non-volatile Dynamic Random Access Memory (DRAM) devices, FLASH devices, volatile or non-volatile Static RAM (SRAM) devices, magnetic disk drives, Solid State Disks (SSDs), etc. Some examples of non-volatile DRAM and SRAM include battery-backed DRAM and battery-backed SRAM. The image scaling system 120 may be embodied as part of the output device 150 or external thereto.

Figure 2:
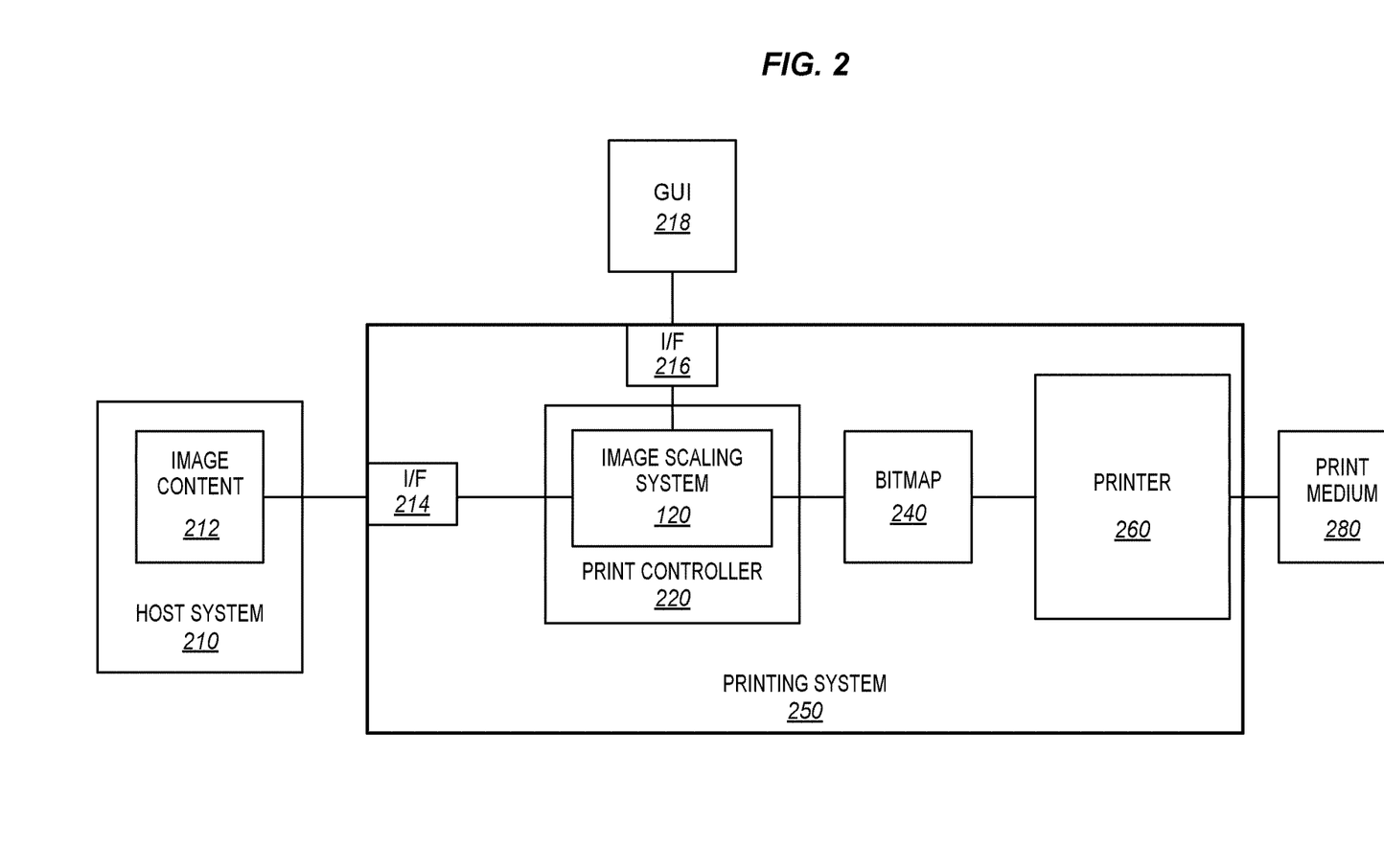
FIG. 2 is a block diagram illustrating a printing system using an image scaling system in an illustrative embodiment.

FIG. 2 is a block diagram illustrating a printing system 250 using the image scaling system 120 in an illustrative embodiment. A host system 210 is in communication with the printing system 250 to print image content 212 onto a print medium 280 via a printer 260. The resulting print medium 280 may be printed in color and/or in any of a number of gray shades. The host system 210 may comprise any computing device, such as a personal computer or a server. The image content 212 may be any file or data (e.g., print job data) that describes how an image on a sheet of print medium is to be printed. For example, the image content 212 may include PostScript data, Printer Command Language ("PCL") data, the Intelligent Printer Data Stream ("IPDS") data, and/or any other printer language data. Alternatively or additionally, the printing system 250 may compose the image content 212 using a Printer Definition Language (e.g., Portable Document Format (PDF) or IPDS) and Job Tickets (for non-IPDS). As such, the printing system 250 may create a first bitmap and scale it to a second bitmap.

The print controller 220 (e.g. DFE, Digital Front End) may be any system, device, circuitry, and/or other suitable component operable to control the printer 260 based on print data received from the host system 210. In doing so, the print controller 220 may transform the image content 212 into a bitmap 240, and transmit the bitmap 240 to the printer 260 which uses it to imprint onto the print medium 280 (e.g., via toner, ink, etc.). The bitmap 240 may be compressed by print controller 220 or image scaling system 120. The image scaling system 120 may be embodied as part of the print controller 220 and/or any other portion of the printing system 250. In some embodiments, the image scaling system 120 may be embodied with the host system 210.

The image scaling system 120 may scale the image content 212 to generate the bitmap 240 according to scaling techniques described in greater detail below. The image scaling system 120 and/or the print controller 220 may be communicatively coupled with the host system 210 via an interface 214, and may also be communicatively coupled to a Graphical User Interface (GUI) 218 via interface 216. The interface(s) 214/216 may be any system, device, or component to receive image data, print data, and/or user input (via keyboard, mouse, display screen, etc., input via GUI 218). The print medium 280 may be continuous form paper, cut sheet paper, and/or any other medium suitable for printing. The printing system 250 may be a high-speed printer operable to print relatively high volumes (e.g., greater than 100 pages per minute).

Figure 3:
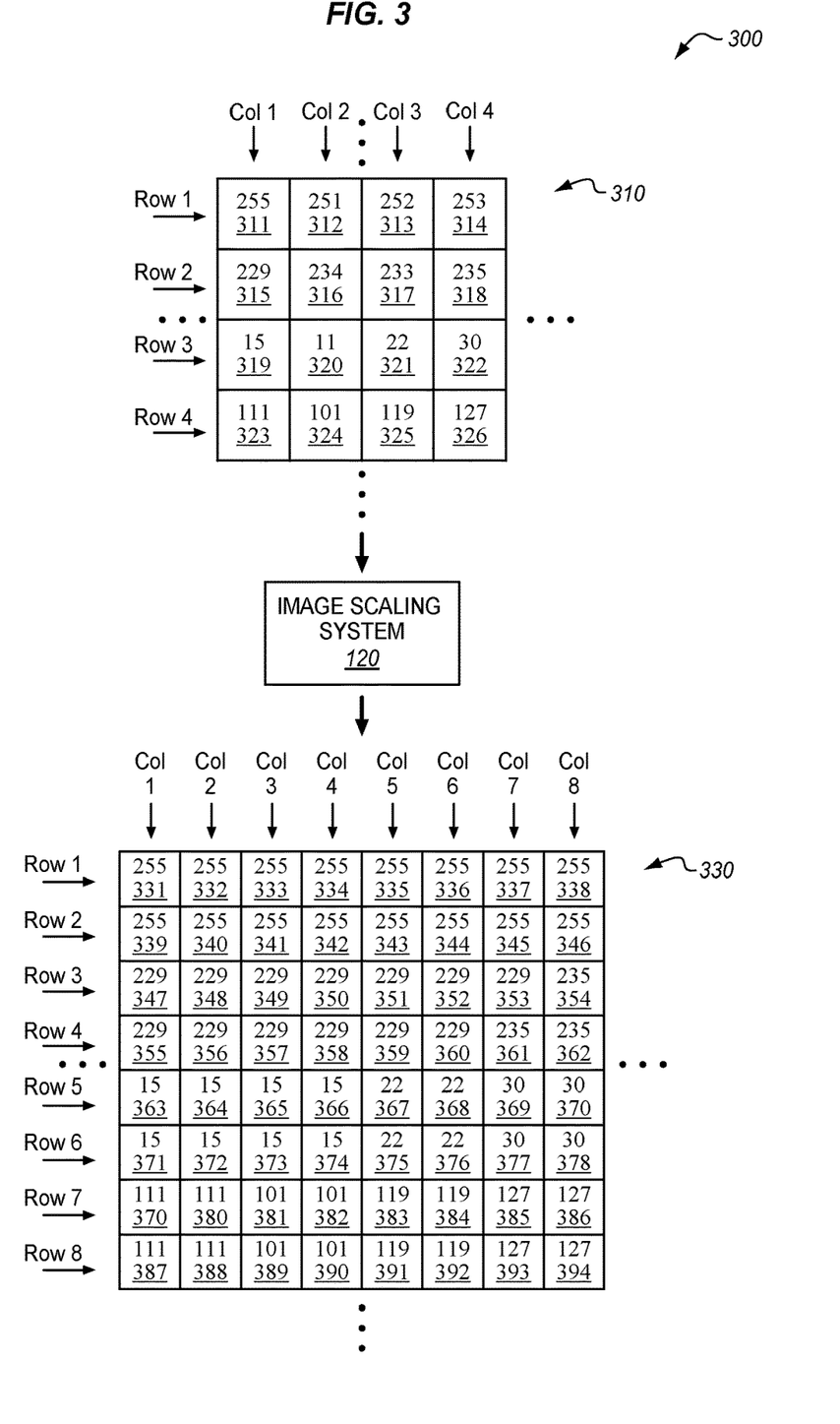
FIG. 3 is a schematic diagram of the image scaling system upscaling a partial input image to create a partial output image in an illustrative embodiment.

FIG. 3 is a schematic diagram 300 of the image scaling system 120 upscaling a partial input image 310 to create a partial output image 330 in an illustrative embodiment. The image scaling system 120 is configured to upscale the partial input image 310 while improving compression in the partial output image 330. In the context of printing, bitmaps 240 transmitted from the print controller 220 to the printer 260 are compressed (e.g., via pack-bits compression or other pattern-based compression techniques) to achieve higher throughput and faster processing for high-speed printing. Image compression is generally improved by maximizing the number of adjacent pels in an image that have the same color intensity value.

Suppose, for example, that the partial input image 310 is part of an embedded image in a print job that is 300 dpi, and that the image scaling system 120 is tasked with upscaling it to 600 dpi to match a print resolution of printer 260 for physically printing the partial output image 330. In this example, the partial input image 310 includes pels 311-326 (i.e., 16 pels) arranged in a grid of 4 rows and 4 columns. Each of the pels 311-326 is associated with a color intensity value. For instance, pel 311 has a color intensity value of 255, pel 312 has a color intensity value of 251, and so on. The color intensity value of this example is an 8-bit value ranging between 0 and 255 inclusive, though it will be appreciated that other schemes may be used.

In upscaling the partial input image 310 to create the partial output image 330, the image scaling system 120 converts pels 311-326 (16 total pels) into pels 331-394 (64 total pels) arranged in a grid of 8 rows and 8 columns. Assuming the spatial area is maintained in the conversion, pel 311 in the partial input image 310 is converted into an area corresponding with pels 331, 332, 339, and 340 in the partial output image 330. Similarly, pel 312 in the partial input image 310 is converted into an area corresponding with pels 333, 334, 341, and 342 in the partial output image 330, and so on.

The image scaling system 120 improves compression in the output image by increasing the number of adjacent pels having the same intensity value while upscaling the image. Consider, for instance, the conversion of Row 1 of the partial input image 310 (e.g., pels 311-314) into corresponding Rows 1-2 of the partial output image 330 (e.g., pels 331-346). Pels 311, 312, 313, and 314 have color intensity values of 255, 251, 252, and 253, respectively. Although the color intensity values of pels 311-314 are similar, and therefore have negligible visual differences to the human observer, compression of pels 311-314 is poor because their values are not the same.

Accordingly, by recognizing that pels 311-314 in the partial input image 310 are visually indistinguishable to the human observer (e.g., have a color intensity value within a threshold range of each other), the image scaling system 120 replaces the color intensity values of corresponding pels in the partial output image 330 to the same value to improve compression. Thus, in this example, the image scaling system 120 scales pels 311-314 (4 pels) to create pels 331-346 (16 pels) in the partial output image 330 and assigns pels 331-346 to a common intensity value (e.g., 255). Pels 331-346 in the partial output image 330 are suited for compression since their values have been modified to a common value, and visual degradation is minimal since they derived from pels 311-314 having small visual differences.

Next, consider conversion of Row 2 of the partial input image 310 (e.g., pels 315-318) into corresponding Rows 3-4 of the partial output image 330 (e.g., pels 347-362). Here, pels 315, 316, and 317 may be considered visually similar (e.g., within a threshold range, or within 5 of each other, in this example) with respective color intensity values of 229, 234, and 233. The image scaling system 120 therefore assigns a common value (e.g., 229) in upscaling to corresponding pels (e.g., pels 347-352 and 355-360) in the partial output image 330, thereby enhancing compression. However, pel 318 in the partial input image 310, with a color intensity value of 235, falls outside the threshold range of its preceding pels (e.g., color intensity value difference of more than 5) and therefore image scaling system 120 does not modify the color intensity value during scaling to preserve image quality. Image quality is preserved when the human observer cannot perceive any significant color intensity (e.g., contrast) differences between the partial input image 310 and the partial output image 330. In other words, the image scaling system 120 avoids replacing the color intensity value of pel 318 as doing so may amount to image degradation perceptible to a human observer. Accordingly, the image scaling system 120 scales pel 318 to create pels 353-354 and 361-362 in the partial output image 330 that include unmodified color intensity values (e.g., 235).

Row 3 of the partial input image 310 is similarly scaled, with pels 319-320 scaled and assigned a common color intensity value (e.g., 15) in corresponding pels (e.g., pels 363-366 and 371-374) in row 5 and row 6 in the partial output image 330. Pels 321-322, being outside a threshold range, are upscaled normally without compression modification, and therefore pels 367-368 and 375-376 (corresponding with pel 321) have an unmodified color intensity value (e.g., 22), and pels 369-370 and 377-378 (corresponding with pel 322) are similarly unmodified (e.g., 30). Lastly, Row 4 of the partial input image 310 includes pels 323-326 which are outside a threshold range and not visually similar to each other. The image scaling system 120 thus upscales to Rows 7-8 in the partial output image 330 without compression modification to preserve visual quality. Accordingly, the image scaling system 120 is configured to, during upscaling an image, enhance the compression of the image while minimizing visual quality degradation. In the context of printing, the technique improves image processing throughput to reduce back-hitch occurrence without perceptible visual difference in the printed output versus the input image. Illustrative details of the operation of the image scaling system 120 is discussed with respect to FIG. 4.

Figure 4:
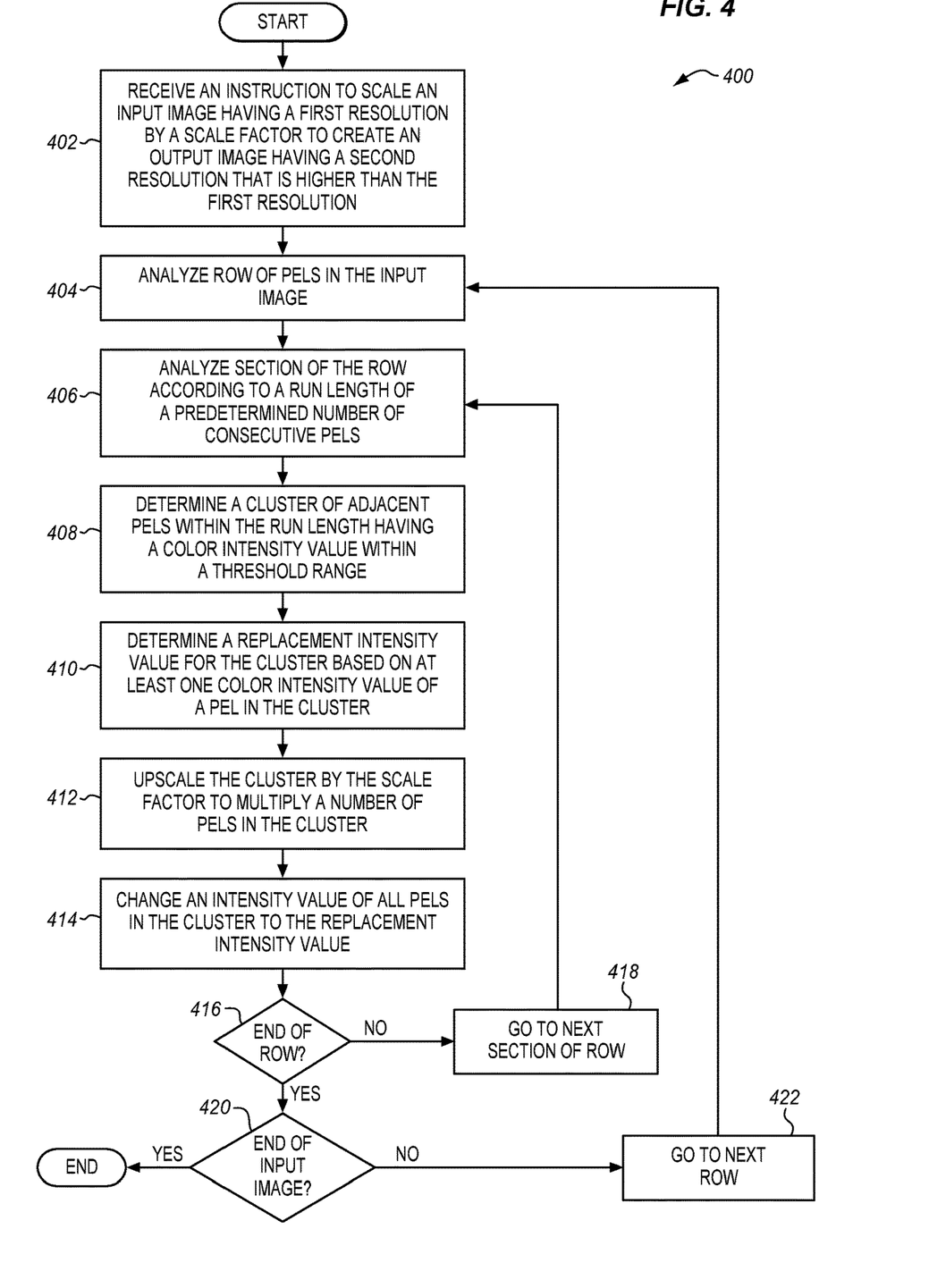
FIG. 4 is a flowchart illustrating a method of scaling an image in an illustrative embodiment.

FIG. 4 is a flowchart illustrating a method 400 of scaling an image in an illustrative embodiment. The steps of method 400 are described with reference to the image scaling system 120 and printing system 250, but those skilled in the art will appreciate that method 400 may be performed with other systems. The steps of the flowcharts described herein are not all inclusive and may include other steps not shown. The steps described herein may also be performed in an alternative order.

In step 402, the image scaling system 120 receives an instruction to scale an input image having a first resolution by a scale factor to create an output image having a second resolution that is higher than the first resolution. The resolution ratio of the scaled image resolution to the original image resolution is typically an integer. For example, assuming the original image resolution is 300 dpi, the scaled image resolution may include 600 dpi, 1200×600 dpi, 1200 dpi, 2400×1200 dpi, 1200×2400 dpi, 2400 dpi, etc. In the example discussed with respect to FIG. 3, the conversion from 300 dpi to 600 dpi equates to a scale factor of 2. It will be appreciated, however, that any number of different resolutions and scale factors may apply. It will be further appreciated that the scale factors for different directions (e.g., row versus column) may be different from each other.

In step 404, the image scaling system 120 analyzes a row of pels in the input image. And, in step 406, the image scaling system 120 analyzes a section of the row according to a run length of a predetermined number of consecutive pels. A row of pels refers to a line of pels arranged along a single dimension (e.g., row or column) of the image. Accordingly, the image scaling system 120 may process the input image row-by-row in a sequential fashion and process each row in sections. The image scaling system 120 may be configured to receive user selection of the run length via the GUI 218. Alternatively, the run length may be determined by a filter classifier described in further detail below.

In the example discussed with respect to FIG. 3, the run length is 4, meaning that the image scaling system 120 analyzes 4 consecutive pels in a row as a group. In some embodiments, the run length is an integer between 4 and 6 inclusive. Generally, a relatively longer run length results in more image compression capability and reduced output image quality, whereas a relatively shorter run length results in less image compression and increased output image quality. In some embodiments, an optimized run length is determined on a row-by-row basis for an image, as described in further detail below.

In step 408, the image scaling system 120 determines a cluster of adjacent pels within the run length having a color intensity value within a threshold range. Thus, for each run length of consecutive pels, the image scaling system 120 determines whether a series of pels exist which are adjacent and similar (e.g., within a threshold) in color intensity value. In the example discussed with respect to FIG. 3, the threshold range is 5, meaning that the image scaling system 120 identifies a cluster where a series of consecutive pels have color intensity values with differences no larger than 5. Accordingly, in that example, the image scaling system 120 determines, for the run length of pels 315-318, that pels 315-317 form a cluster of adjacent pels within a threshold range (e.g., color intensity values 229, 234, and 233 are within 5 of each other). And, it is determined that pel 318 with color intensity value 235 is a difference of 6 from a pel in that group and is therefore excluded from the cluster.

In some embodiments, the threshold range is an integer between 4 and 6 inclusive (e.g., in embodiments in which the color intensity value range is between 0 and 255 inclusive). Generally, a relatively longer threshold range results in more image compression capability and reduced image quality, whereas a relatively shorter threshold range results in less image compression and increased image quality. In some embodiments, an optimized threshold range is determined on a row-by-row basis for an image, as described in further detail below.

In step 410, the image scaling system 120 determines a replacement intensity value for the cluster based on at least one color intensity value of a pel in the cluster. In one embodiment, the image scaling system 120 determines the replacement intensity value for the cluster based on the color intensity value of a single pel in the cluster. For example, the image scaling system 120 may select the color intensity value of the first pel of the cluster in the sequence of pels. Returning again to the example of FIG. 3, the cluster comprising pels 315-317 is assigned to a replacement intensity value of its first pel, pel 315, a value of 229.

In an alternative embodiment, the image scaling system 120 determines the replacement intensity value for the cluster based on an average of color intensity values of pels in the cluster. The average may include a mean, medium, or other calculated statistic representing a central tendency of pels in the cluster. Although determining the replacement intensity value for the cluster based on an average is generally more accurate than using the color intensity value of one selected pel, the computational expense is higher and the increased accuracy may not be perceptible by human vision. Accordingly, in the interest minimizing computational cost, it may be desirable for the image scaling system 120 to select/use the color intensity value of a single pel in the cluster as the replacement intensity value.

In step 412, the image scaling system 120 upscales the cluster by the scale factor to multiply a number of pels in the cluster. In the example of FIG. 3, the scale factor of 2 multiplies the pels by area in two dimensions. In other embodiments, a scale factor may multiply the pels by area in one dimension. As such, the cluster comprising pels 315-317 (3 pels) multiplies in both dimensions to convert to pels 347-352 and 355-360 (12 pels). The image scaling system 120 thus creates the partial output image 330 by scaling the clusters identified in the partial input image 310.

In step 414, the image scaling system 120 changes an intensity value of all pels in the cluster to the replacement intensity value. Continuing with the example cluster of pels 315-317 discussed above, the image scaling system 120 assigns corresponding pels 347-352 and 355-360 of the partial output image 330 to a replacement intensity value (e.g., 229) such that each of the pels 347-352 and 355-360 of the cluster have a common value. Generally, an area of the output image corresponding with at least one pel in the input image is modified by the changing of the intensity value of all pels in the cluster. As such, the partial output image 330 includes an increased number of adjacent pels that have the same color intensity value.

In step 416, the image scaling system 120 determines whether the end of a row is reached. If not, the method proceeds to step 418 and the image scaling system 120 analyzes the next section in the row. In other words, the image scaling system 120 analyzes the next run length of pels beginning with the first pel after the cluster previously determined in step 408. Near the end of the row, if the number of remaining pels is less than the run length, the image scaling system 120 analyzes the remaining number of available pels.

Otherwise, if the end of the row is reached in step 416, the method proceeds to step 420 to determine whether the end of the input image is reached. If the end is reached, the scaling of the output image is complete and a bitmap 240 of the output image is generated. The bitmap 240 may be compressed after step 420. If the end of the input image is not reached, the method proceeds to step 422 and the image scaling system 120 analyzes the next row in the input image. In this way, steps of the method repeat section-by-section and row-by-row to upscale an input image into an output image having increased total number of adjacent pels with the same color intensity value. Advantageously, the upscaling process provides the output image with an enhanced ability to compress, freeing-up resources of downstream components that may receive, process, and/or transmit the output image. Moreover, the upscaling technique described is adaptable to achieve a balance between increasing compression ability in the output image and decreasing image accuracy in a manner that remains imperceptible to human vision.

Figure 5:
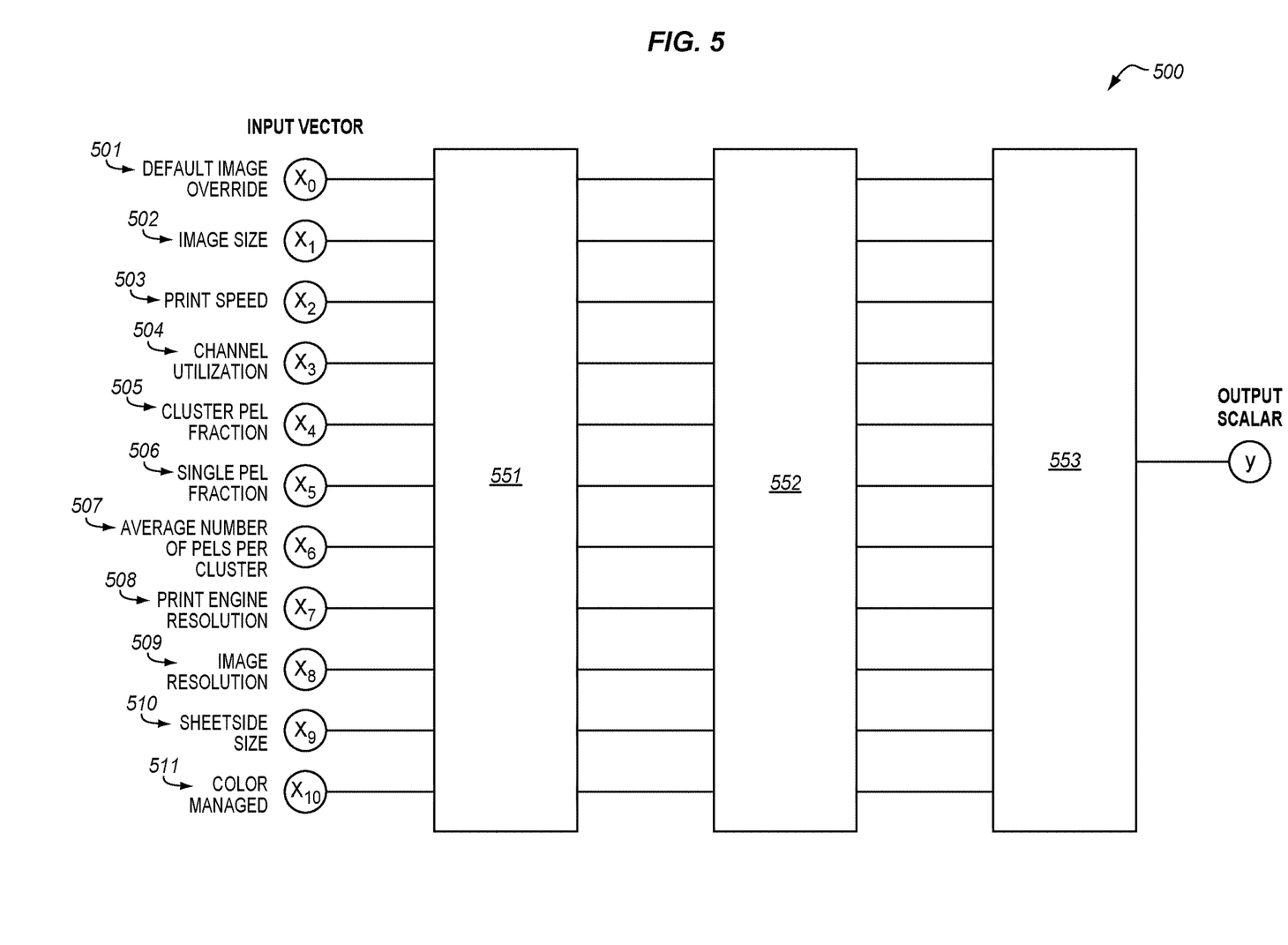
FIG. 5 is a block diagram of a filter classifier in an illustrative embodiment.

FIG. 5 is a block diagram of a filter classifier 500 in an illustrative embodiment. Generally, the filter classifier 500 is configured to perform preflight analysis of image objects of a print job to define the proper filter settings for each image object. Alternatively or additionally, the filter classifier 500 may predict, before printing, whether a print job is at risk of a back-hitch condition, and set optimized parameters to prevent back-hitching.

The filter classifier 500 includes a first stage filter 551, a second stage filter 552, and a third stage filter 553. The inputs 501-511 to the first stage filter 551 include a default image override 501, image size 502, print speed 503, channel utilization 504, cluster pel fraction 505, single pel fraction 506, average number of pels per cluster 507, print engine resolution 508, image resolution 509, sheetside size 510, and color managed 511. The first stage filter 551 may be implemented with the following function:

$$Z = W * X + b \qquad \text{Equation (1):}$$

Here, Z is the output, W is a 10×10 weight matrix, * is a dot product, X is a vector (e.g., inputs 501-511), and b is a bias vector. Parameters W and b may be determined empirically (e.g., via machine learning training). The output is provided to the second stage filter 552, which may be implemented with the following function:

$$\text{probability}(z_i) = \frac{e^{z_i}}{\sum_j e^{z_j}} \qquad \text{Equation (2)}$$

During evaluation of pels into clusters, the second stage filter 552 counts the total number of single-pel clusters, the total number of multiple-pel clusters, and the total number of pels in all clusters. This procedure is repeated for all rows in the image while tracking the total number of single pels, the total number of clusters, and the total number of pels in all clusters. The calculated statistics are input to the third stage filter 553. The third stage filter 553 selects the index corresponding to the largest probability to process the image to achieve the desired results. That is, the third stage filter 553 selects an index that associates a back-hitch probability with a combination of run length and threshold range for rows in the image. Accordingly, the filter classifier 500 is configured to determine the run length and the threshold range for each row in the input image by analyzing the input image with respect to a desired or targeted print speed. In some embodiments, the filter classifier 500 may select different run lengths and threshold ranges for different image rows, including run lengths and threshold ranges in different combinations for even and odd image rows. Thus, different combinations of threshold range and run length may be used for different rows on the same image for more flexibility and tradeoffs between compression and print quality. The filter classifier 500 may select relatively longer run lengths and relatively larger threshold ranges to increase a compression ratio of the output image, and to select relatively shorter run lengths and relatively smaller threshold ranges to increase a quality of printed output.

The filter classifier 500 may thus perform image filtering and image scaling to the print engine resolution during the same procedure. Additionally, image filter parameters may be set during preflight to integrate image filtering as part of the Digital Front End processing to determine, before committing to printing, whether back-hitching may occur for a print job. The filter classifier 500 may be configured to process image objects only so as to minimize computation associated with filtering sheetside bitmaps (e.g., thus excluding processing a composite bitmap including text objects, line art objects, etc.). In an alternative embodiment, the filter classifier 500 may perform the image filtering and image scaling during preflight by removing the image from the print job data stream, performing the operation, and replacing the image in the print job data stream for normal Digital Front End processing. In some embodiments, the filter classifier 500 is implemented in the image scaling system 120 and/or print controller 220.

Figure 6:
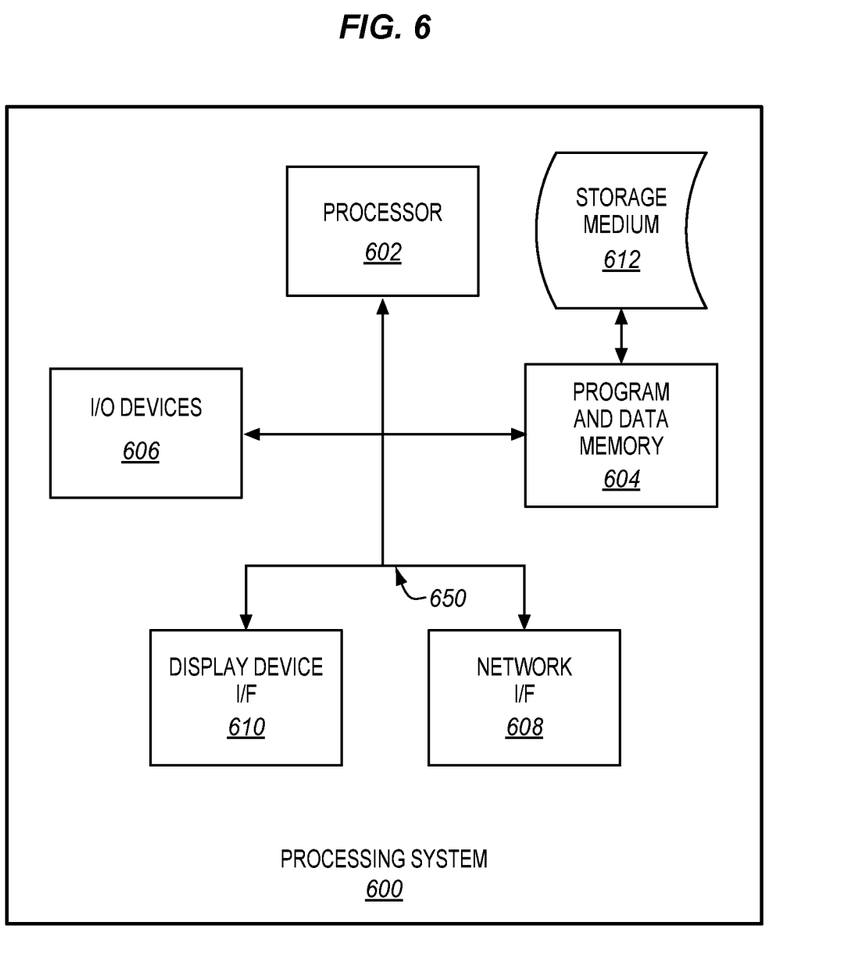
FIG. 6 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of the image scaling system 120 to perform the various operations disclosed herein. FIG. 6 illustrates a processing system 600 operable to execute a computer readable medium embodying programmed instructions to perform desired functions in an illustrative embodiment. Processing system 600 is operable to perform the above operations by executing programmed instructions tangibly embodied on computer readable storage medium 612. In this regard, embodiments of the invention can take the form of a computer program accessible via computer readable storage medium 612 providing program code for use by a computer or any other instruction execution system. For the purposes of this description, computer readable storage medium 612 can be anything that can contain or store the program for use by the computer.

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 610 may be integrated with the system to interface to one or more display devices, such as printing systems and screens for presentation of data generated by processor 602.

Although specific embodiments are described herein, the scope of the disclosure is not limited to those specific embodiments. The scope of the disclosure is defined by the following claims and any equivalents thereof.

What is claimed is:

1. An image scaling system comprising:
   a processor configured to receive an instruction to scale an input image having a first resolution by a scale factor to create an output image having a second resolution that is higher than the first resolution, to analyze the input image by rows of pels, and to analyze each row in sections according to a run length of a predetermined number of consecutive pels,
   the processor configured, for each run length of consecutive pels, to determine a cluster of adjacent pels within the run length having a color intensity value within a threshold range, and to determine a replacement intensity value for the cluster based on at least one color intensity value of a pel in the cluster;
   the processor configured to create the output image by: upscaling the cluster by the scale factor to multiply a number of pels in the cluster, and changing an intensity value of all pels in the cluster to the replacement intensity value, wherein an area of the output image corresponding with at least one pel in the input image is modified by the changing of the intensity value of all pels in the cluster,
   wherein the processor is configured to select relatively longer run lengths and relatively larger threshold ranges to increase a compression ratio of the output image, and to select relatively shorter run lengths and relatively smaller threshold ranges to increase a quality of the output image.

2. The image scaling system of claim 1 wherein:
   the processor is configured to determine the run length and the threshold range for each row in the input image by analyzing the input image with respect to a desired print speed.

3. The image scaling system of claim 1 wherein:
   the processor is configured to determine the replacement intensity value for the cluster based on an average of color intensity values in the cluster.

4. The image scaling system of claim 1 wherein:
   the processor is configured to determine the replacement intensity value for the cluster based on the color intensity value of a first pel in the cluster.

5. The image scaling system of claim 1 further comprising:
   the processor is configured to upscale the cluster by the scale factor to multiply the number of pels in the cluster while maintaining a spatial area of the cluster.

6. A printer comprising the image scaling system of claim 1.

7. A method of scaling an input image, the method comprising:
   receiving an instruction to scale an input image having a first resolution by a scale factor to create an output image having a second resolution that is higher than the first resolution;
   analyzing the input image by rows of pels;
   analyzing each row in sections according to a run length of a predetermined number of consecutive pels;
   for each run length of consecutive pels:
      determining a cluster of adjacent pels within the run length having a color intensity value within a threshold range; and
      determining a replacement intensity value for the cluster based on at least one color intensity value of a pel in the cluster; and
   creating the output image by:
      upscaling the cluster by the scale factor to multiply a number of pels in the cluster; and
      changing an intensity value of all pels in the cluster to the replacement intensity value,
   wherein an area of the output image corresponding with at least one pel in the input image is modified by the changing of the intensity value of all pels in the clusters;
   selecting relatively longer run lengths and relatively larger threshold ranges to increase a compression ratio of the output image; and
   selecting relatively shorter run lengths and relatively smaller threshold ranges to increase a quality of the output image.

8. The method of claim 7 further comprising:
   determining the run length and the threshold range for each row in the input image by analyzing the input image with respect to a desired print speed.

9. The method of claim 7 further comprising:
determining the replacement intensity value for the cluster based on an average of color intensity values in the cluster.

10. The method of claim 7 further comprising:
determining the replacement intensity value for the cluster based on the color intensity value of a first pel in the cluster.

11. The method of claim 7 further comprising:
upscaling the cluster by the scale factor to multiply the number of pels in the cluster while maintaining a spatial area of the cluster.

12. A non-transitory computer readable medium embodying programmed instructions which, when executed by a processor, are operable for performing a method of scaling an input image, the method comprising:
receiving an instruction to scale an input image having a first resolution by a scale factor to create an output image having a second resolution that is higher than the first resolution;
analyzing the input image by rows of pels;
analyzing each row in sections according to a run length of a predetermined number of consecutive pels;
for each run length of consecutive pels:
determining a cluster of adjacent pels within the run length having a color intensity value within a threshold range; and
determining a replacement intensity value for the cluster based on at least one color intensity value of a pel in the cluster; and
creating the output image by:
upscaling the cluster by the scale factor to multiply a number of pels in the cluster; and
changing an intensity value of all pels in the cluster to the replacement intensity value,
wherein an area of the output image corresponding with at least one pel in the input image is modified by the changing of the intensity value of all pels in the cluster;
selecting relatively longer run lengths and relatively larger threshold ranges to increase a compression ratio of the output image; and
selecting relatively shorter run lengths and relatively smaller threshold ranges to increase a quality of the output image.

13. The medium of claim 12, the method further comprising:
determining the run length and the threshold range for each row in the input image by analyzing the input image with respect to a desired print speed.

14. The medium of claim 12, the method further comprising:
determining the replacement intensity value for the cluster based on an average of color intensity values in the cluster.

15. The medium of claim 12, the method further comprising:
determining the replacement intensity value for the cluster based on the color intensity value of a first pel in the cluster.

16. The medium of claim 12, the method further comprising:
upscaling the cluster by the scale factor to multiply the number of pels in the cluster while maintaining a spatial area of the cluster.

* * * * *